(12) United States Patent
Smith, Jr. et al.

(10) Patent No.: US 8,157,396 B2
(45) Date of Patent: Apr. 17, 2012

(54) INHIBITING UNWANTED PHOTOGRAPHY AND VIDEO RECORDING

(76) Inventors: Wilbert Leon Smith, Jr., Pasadena, CA (US); Keelo Lamance Jackson, Chatsworth, CA (US)

(*) Notice: Subject to any disclaimer, the term of this patent is extended or adjusted under 35 U.S.C. 154(b) by 688 days.

(21) Appl. No.: 12/335,484

(22) Filed: Dec. 15, 2008

(65) Prior Publication Data

US 2010/0149782 A1    Jun. 17, 2010

(51) Int. Cl.
*G03B 15/02* (2006.01)
(52) U.S. Cl. .............................. 362/3; 362/4
(58) Field of Classification Search .............. 362/3, 4, 362/8, 11, 12
See application file for complete search history.

(56) References Cited

U.S. PATENT DOCUMENTS

| | | |
|---|---|---|
| 3,738,239 A | 6/1973 | Higuchi |
| 3,792,648 A | 2/1974 | Ishiguro |
| 4,122,465 A | 10/1978 | Hasegawa |
| 4,126,877 A | 11/1978 | Ohtaki |
| 4,427,278 A | 1/1984 | Ishida |
| 4,429,971 A | 2/1984 | Mizokami |
| 4,466,727 A | 8/1984 | Nagaoka |
| 4,494,851 A | 1/1985 | Maida |
| 4,494,852 A | 1/1985 | Smith, Jr. |
| 4,519,684 A | 5/1985 | Francis, Jr. |
| 4,555,648 A | 11/1985 | Iida |
| 4,701,672 A | 10/1987 | Sikora |
| 5,270,764 A | 12/1993 | Ichihara |
| 5,422,543 A | 6/1995 | Weinberg |
| 5,621,494 A | 4/1997 | Kazumi |
| 6,111,364 A * | 8/2000 | Davis et al. ................ 315/241 P |
| 6,937,163 B2 * | 8/2005 | Caulfield et al. .............. 362/494 |
| 2003/0151690 A1 | 8/2003 | Tecu |
| 2004/0202382 A1 | 10/2004 | Pilu |

FOREIGN PATENT DOCUMENTS

| | | | |
|---|---|---|---|
| GB | 2 222 035 A | | 7/1988 |
| GB | 2324858 A | * | 11/1998 |
| JP | 57-138626 | | 8/1982 |

OTHER PUBLICATIONS

HP focuses on paparazzi-proof cameras CNET News Jan. 25, 2005 5:35 PM PST United States David Becker.

\* cited by examiner

*Primary Examiner* — David V Bruce
(74) *Attorney, Agent, or Firm* — The Law Office of Herbert T. Patty

(57) ABSTRACT

A method, apparatus, and system are disclosed. The apparatus includes a shaft operable to be held by an entity and a housing extending from one end of the shaft and operable to allow multiple deterrents to be emitted there from. The housing includes a rotation member coupled to a rim portion of the housing and operable to rotate along a track portion within the rim portion. The apparatus further includes a transparent material coupled to the rotation member and operable to allow a deterrent to travel there through. The housing includes a light source coupled to the transparent material and operable to emit a light. Further, the apparatus includes a swivel meshed between the shaft and the housing and operable to allow the housing oscillate in an angular direction. Each deterrent is operable to obscure an image of the entity captured by filming equipment.

50 Claims, 13 Drawing Sheets

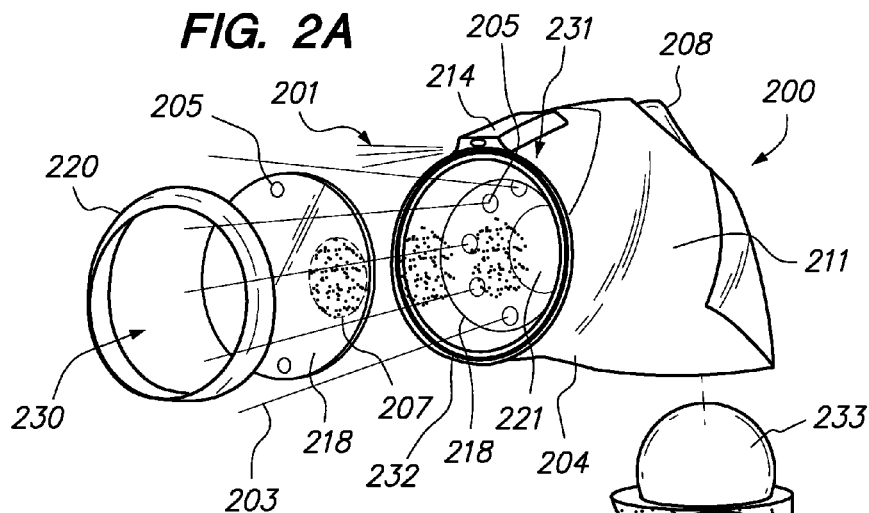
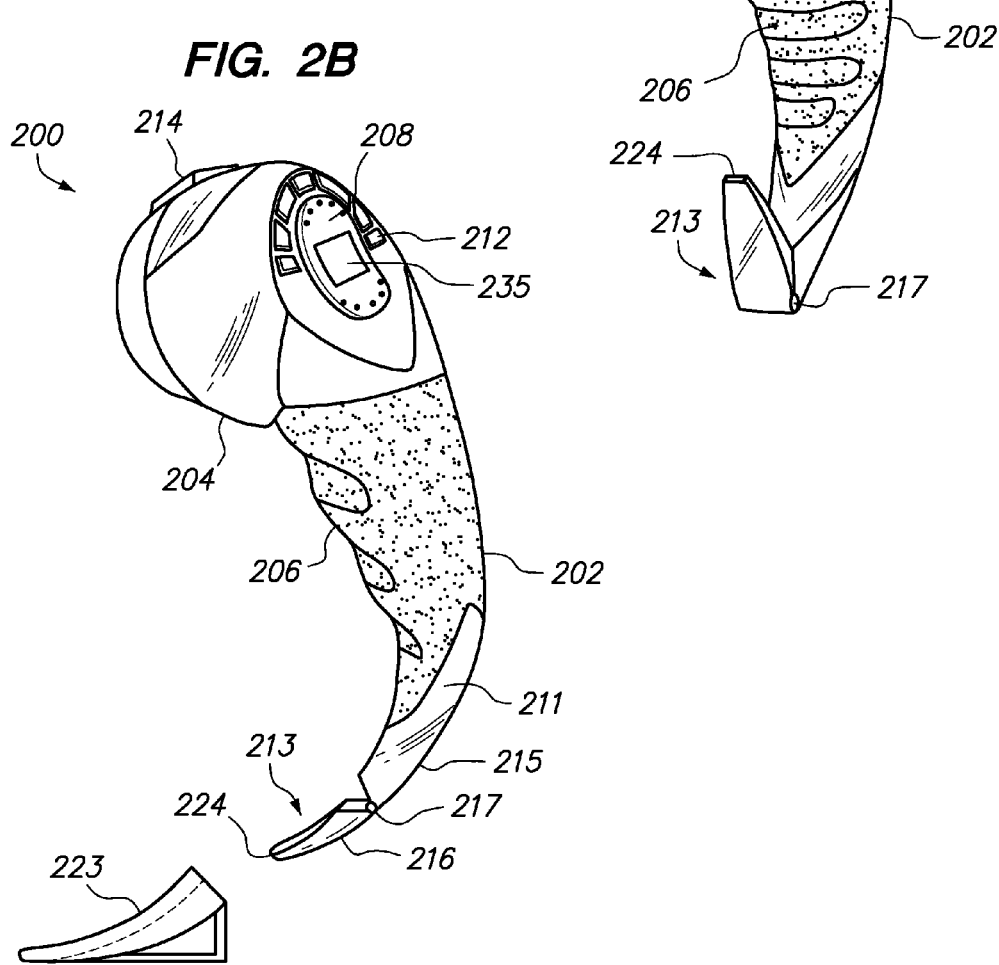

INHIBITING UNWANTED PHOTOGRAPHY AND VIDEO RECORDING

FIELD OF INVENTION

This invention relates generally to photography and video recording, and more specifically, to an apparatus and method which inhibits one's image from being captured by an individual using video recorders and flash photography.

BACKGROUND OF THE INVENTION

Photography has been around for many years. A problem associated with photography is oftentimes many people do not want to have their picture taken. For example, many celebrities do not want their picture taken or pictures of their companion's or relative's taken because they feel it is an invasion of their privacy.

U.S. Pat. No. 6,351,208, issued on Feb. 26, 2002, discloses a device for preventing detection of a traffic violation. This device uses an ultraviolet laser emitter to interfere with an automatic camera used to photograph traffic violations. The ultraviolet laser emitter works by hindering the ability of a radar device from accurately measuring the speed of a vehicle. Accordingly, an accurate picture cannot be taken. However, there is some concern to whether it is lawful to interfere with the operation of the radar detection unit and automatic camera.

U.S. Pat. No. 6,937,163, issued on Aug. 30, 2005, discloses a device for preventing a photographic image from being taken. The device includes a triggering mechanism that generates a signal when a light signal indicative of a camera flash is detected. In addition, the device includes a flash unit that is coupled to the triggering mechanism which generates a counteracting flash after receiving a signal generated by the triggering mechanism. As such, generating a counteracting flash a very short time after detecting the flash, the device saturates an area of the camera's image field during the camera's exposure period to obscure the image in that area. However, there is some concern that an attempt to prevent one's picture from being taken by generating a counteracting flash may not be effective in the midst of high speed cameras.

Thus, there is a need to effectively deter, discourage, and inhibit persons with access to high speed cameras and video recorders from taking unwanted pictures and capturing video streams of individuals who desire to maintain their privacy. The present invention addresses such a need.

SUMMARY OF THE INVENTION

A method, apparatus, and system are disclosed. The method includes bombarding an area with deterrents to obscure an image of an entity captured by photographic and video recording equipment. The apparatus includes a shaft component operable to be held by an entity and a housing component extending from one end of the shaft component and operable to allow multiple deterrents to be emitted there from. The housing component includes a rotation member coupled to a rim portion of the housing component and operable to rotate along a track portion within the rim portion. The apparatus further includes a transparent material coupled to the rotation member and operable to allow a deterrent to travel there through. The housing component includes a light source coupled to the transparent material which is operable to emit light. Further, the apparatus includes a swivel component meshed between the shaft component and the housing component and operable to allow the housing component oscillate in an angular direction. In addition, the housing component includes a deterrent compartment coupled to an external portion of the housing component and operable to allow an additional deterrent to be emitted there from. Each deterrent is operable to obscure an image of the entity captured by filming equipment. The apparatus further includes a trigger component coupled to the housing component and operable to engage each deterrent.

BRIEF DESCRIPTION OF THE DRAWINGS

FIG. 2A is an exploded front view of an image distortion apparatus in accordance with the present invention.

FIG. 2B is a perspective back view of an image distortion apparatus and a cradle in accordance with the present invention.

DETAILED DESCRIPTION

This invention relates generally to photography and video recording, and more specifically, to an apparatus and method which inhibits one's image from being captured by an individual using video recorders and flash photography. The following description is presented to enable one having ordinary skill in the art to make and use the embodiment and is provided in the context of a patent application and the generic principles and features described herein will be apparent to those skilled in the art. Thus, the present embodiment is not intended to be limited to the embodiments shown, but is to be accorded the widest scope consistent with the principles and features described herein.

A system and method in accordance with the present invention can be utilized to deter, discourage, and inhibit unwanted video recording and photographs from being taken. In particular, an apparatus in accordance with the present invention is utilized to emit deterrents in the direction of filming equipment to obscure, overexpose, and/or underexpose captured images on a film, digital card, magnetic videotape, and other mediums. The apparatus may be utilized manually such that an entity may engage the apparatus to inhibit unwanted video recording or photographs. The apparatus may also be utilized automatically to preempt attempts to take unwanted video recording or photographs. The system and method is also applicable to military defense and may be utilized by soldiers during military operations. In addition, the system and method may be utilized to maintain security of highly classified information. Accordingly, a system and method in accordance with the present invention may be utilized to discourage unwanted video recording and photographs, preempt unwanted video recording and photographs, maintain an individual's privacy, and to protect an individual's identity.

Figure 1:
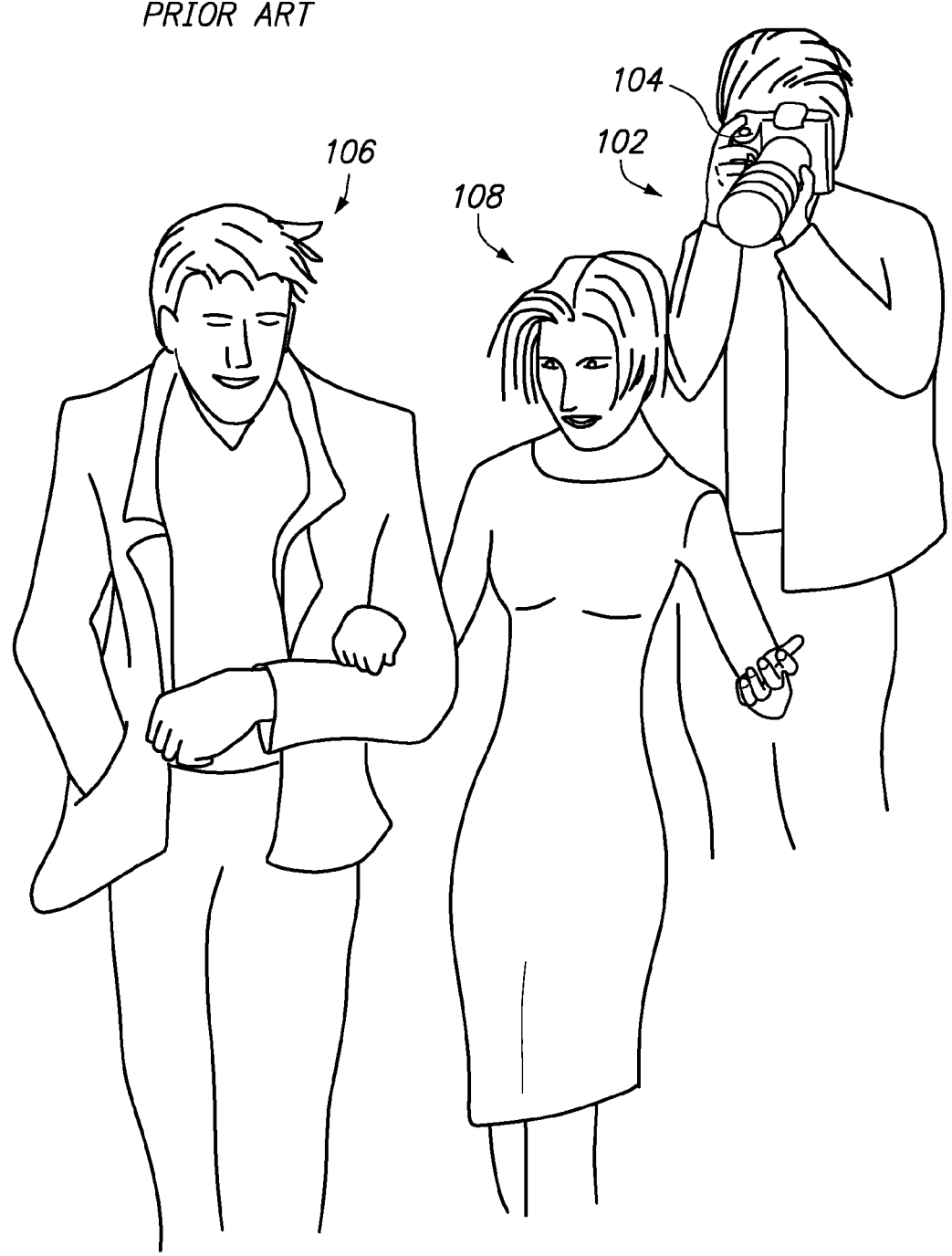
FIG. 1 is an illustration of a paparazzo taking a picture of a celebrity and companion at a public venue.

FIG. 1 is an illustration of an entity 108, accompanied by a companion 106 at a public venue. Behind the entity 108 and companion 106 is an individual 102 taking a picture of the entity 108 and the companion 106 with filming equipment 104. The individual's 102 act of taking a picture of the entity 108 and the companion 106 may invade the privacy of the entity 108 and companion 106 and become a nuisance.

In FIG. 1, the entity 108 may be a celebrity, however, but in other embodiments the entity 108 may be a non-famous person, a public official, a prisoner, a patron, or a classified operative under control of a government authority, and this would be in the spirit and scope of the present invention. Further, the companion 106 may be a significant other, relative, friend, business associate, staff person, or guest and this would also be in the spirit and scope of the present invention. Furthermore, in the embodiment shown in FIG. 1, the celebrity is at a public venue, however, the celebrity could be at any venue or area, including but not limited to a restaurant, nightclub, parking lot, along a sidewalk, a corridor of a government building, or a battle zone and this would be in the spirit and scope of the present invention.

In addition, FIG. 1 illustrates that the filming equipment 104 utilized by individual 102 is a camera. However, filming equipment 104 may include photographic equipment or video recording equipment such as but not limited to a camcorder, digital camera, or a film camera and this would also be in the spirit and scope of the present invention. Specifically, the term "filming equipment" is utilized within the written description to refer to any mechanism used to create a recording of an image or streams of images of a representation of a likeness of a person(s) or object(s).

FIG. 2A is an exploded front view illustration of an image distortion apparatus 200 in accordance with the present invention which may be utilized by an entity to deter, discourage, and inhibit unwanted photography and video recording. As shown, image distortion apparatus 200 includes a shaft component 202 operable to be held by an entity. In an embodiment, the shaft component 202 may include a finger wedge 206 such that an entity can effectively grip and hold the image distortion apparatus 200. Additionally, the image distortion apparatus 200 includes a housing component 204 extending from one end of the shaft component 202 and operable to allow multiple deterrents 201, 203, 207 to be emitted from the housing component 204. In an embodiment, multiple deterrents 201, 203, 207 may include any one or a combination of a focused beam of light, a strobe light, and a photographic flash.

The housing component 204 contains circuitry, components, and energy sources for emitting the deterrents 201, 203, 207 and an energy supply for the image distortion apparatus 200. One having ordinary skill in the art is well aware of circuitry and components for a focused beam of light, a strobe light, and a photographic flash. Additionally, one having ordinary skill in the art is well aware of circuitry and components for energy sources for the aforementioned deterrents 201, 203, 207. Accordingly, the housing component 204 houses typical circuitry and components used to produce the aforementioned deterrents 201, 203, 207, in addition to typical energy sources to power the apparatus 200. In an embodiment, all of the circuitry for the image distortion apparatus 200 is within the housing component 204, including but not limited to the circuitry and/or components for the deterrents 201, 203, 207 and energy sources for the apparatus 200.

In addition, the housing component 204 includes a rotation member 220 coupled to a rim portion 231 of the housing component 204, as illustrated in FIG. 2A. In an embodiment, the rotation member 220 rotates along a track portion 232 of the rim portion 231. In operation, the image distortion apparatus 200 engages the rotation member 220 to rotate in a clockwise or counter-clockwise direction along the track portion 232 of the rim portion 231.

The rotation member 220 may be powered by a small motor (not shown) so that when the member 220 is engaged, the member 220 rotates and causes the plurality of light sources 205 to rotate. Accordingly, the plurality of light sources 205 may also rotate in a clockwise or counter-clockwise direction depending upon the rotation direction of the rotation member 220.

The housing component 204 may also contain typical circuitry and components known in the art of rotating devices. As such, one having ordinary skill in the art is well aware of rotating devices and therefore incorporating conventional circuitry and components (including motors) of rotating devices is within the spirit and scope of the present invention.

Additionally, the housing component 204 includes a transparent material 218 within the front face opening 230 of the housing component 204. In an embodiment, the transparent material 218 may comprise any light penetrable material such that deterrents 203, 207 can be effectively emitted from the housing component 204, and in an embodiment, the transparent material 218 comprises glass. As shown, the transparent material 218 is attached to the rotation member 220 and is operable to move in accordance to the rotation member 220.

Further, the housing component 204 includes a plurality of light sources 205 disposed on the transparent material 218. In an embodiment, the plurality of light sources 205, when engaged, emits focused beams of light. In addition, the image distortion apparatus 200 can be programmed such that the plurality of light sources 205 can rotate about the transparent material 218 by way of the rotation member 220. Accordingly, the image distortion apparatus 200 has the functionality to create rotating emissions of light and may be utilized to create distortions in images captured by a camera, in addition to video streams captured by video recorders.

In addition, the image distortion apparatus 200 can be programmed such that the rotation member 220, and thus the plurality of light sources 205 disposed upon the transparent material 218, rotates according to a predetermined frequency. For example, the image distortion apparatus 200 can be programmed such that the rotation member 220 and the plurality of light sources 205 rotate at a frequency of 60-180 rotations per minute (RPM). In an embodiment, the image distortion apparatus 200 is programmed such that the rotation member 220 rotates at a frequency of 90 RPM.

Further, multiple transparent materials 218 may be contained within the housing component 204. Furthermore, the image distortion apparatus 200 can be programmed such that all of the transparent materials 218 rotate in a predetermined direction and frequency.

Additionally, the image distortion apparatus 200 may include an oscillating motor (not shown) and drive clutch components (not shown) to enable the housing component 204 to oscillate back in forth in a horizontal or angular direction via a swivel component 233 meshed between the housing component 204 and the shaft component 202. Due to the various number of oscillating devices known in the art, such as oscillating cooling fans, one having ordinary skill in the art is well aware of oscillating circuitry and components. As such, the housing component 204 contains typical circuitry and components used to create horizontal and/or angular oscillation and this would be in the spirit and scope of the present invention.

Furthermore, the image distortion apparatus 200 can be programmed such that the housing component 204 oscillates a predetermined angular distance. For example, the image distortion apparatus 200 may oscillate the housing component 204 a total angular distance of approximately 90°. In an embodiment, the housing component 204 oscillates back in forth angularly from −45° to +45°. In addition, the image distortion apparatus 200 can also be programmed such that the housing component 204 oscillates at a predetermined frequency. For example, the image distortion apparatus 200 may oscillate the housing component 204 a full cycle, between −45° to +45°, at a frequency of 60-150 cycles per second (CPS). Specifically, in an embodiment, the image distortion apparatus 200 oscillates the housing component 204, between −45° to +45°, at a frequency of 90 CPS.

In addition, the image distortion apparatus 200 includes an aperture 221 from which a deterrent is emitted there from. In an embodiment, a strobe light is emitted from aperture 221. However, in other embodiments, a focused beam of light is emitted from the aperture 221. In operation, image distortion apparatus 200 can be programmed such that a strobe light is emitted from aperture 221 and focused beams of light are emitted from plurality of light sources 205 concurrently or successively. For example, in an embodiment, both a strobe light is emitted from the aperture 221 and focused beams of light are emitted from the plurality of light sources 205 simultaneously. In addition, according to the embodiment, the plurality of light sources 205 are rotated in a counterclockwise direction via the rotation member 220 while emitting light.

In an embodiment, the image distortion apparatus 200 further includes a hanging mechanism 213 extending from one end of the shaft component 202 and operable to allow the image distortion apparatus 200 to be hung from a structure. In addition, the hanging mechanism 213 may enable the image distortion apparatus 200 to be attached to a structure such that the apparatus 200 can emit deterrents 201, 203, 207 from a fixed position.

The hanging mechanism 213 may include a hinge 217, which enables the mechanism 213 to assume multiple positions by virtue of moving a bottom section 216 of the mechanism 213 relative to a top section 215 of the mechanism 213. The hinge 217 may be robust such that an entity can lock the hanging mechanism into multiple positions. For example, as illustrated in FIG. 2A, the hanging mechanism 213 is in a first position, such that mechanism 213 enables the apparatus 200 to be hung from a structure. Specifically, the first position of the mechanism 213 may be characterized such that the angular distance from the top section 215 and the bottom section 216 of the hanging mechanism 213 is less than or equal to 90°.

Further, the image distortion apparatus 200 includes a deterrent compartment 214 coupled to an external portion of the housing component 204. The deterrent compartment 214 is also operable to allow additional deterrents, such as deterrent 201, to be emitted there from.

Furthermore, the image distortion apparatus 200 includes a trigger component 208 coupled to the housing component 204 and is operable to engage each deterrent 201, 203, and 207 within the housing component 204 and deterrent compartment 214. The image distortion apparatus 200 may be configured such that the focused beam of light and strobe light deterrents are emitted a distance of 15-40 feet. In an embodiment, the image distortion apparatus 200 emits the focused beam of light and strobe light deterrents from the housing component 204 a distance of 30 feet from the apparatus 200. Accordingly, an entity can activate the image distortion apparatus 200 to deter, discourage, or inhibit persons with access to high speed cameras and video recorders from taking unwanted pictures and capturing video recordings from a distance up to 40 feet away from the entity.

In an embodiment, the deterrents emitted from the deterrent compartment 214 are unique to those emitted from the front face opening 230 of the housing component 204. For example, deterrents 203 and 207, focused beam of light and strobe light deterrents respectively, are emitted from the front face opening 230 of the housing component 204, whereas deterrent 201, a photographic flash, is emitted from the deterrent compartment 214. In another embodiment, the deterrents within the housing component 204 and the deterrent compartment 214 are emitted simultaneously. In yet another embodiment, the trigger component 208 may be engaged to emit each deterrent. The deterrents may be any of a focused beam of light, a strobe light, and a photographic flash. In addition, the deterrents may be selectively engaged independently or collectively, depending upon the preference of an entity. In an embodiment, multiple deterrents 201, 203, and 207 are engaged to obscure an image of an entity captured by filming equipment such as a photographic camera and a video recorder.

In an embodiment, as illustrated in FIG. 2A, a photographic flash 201 is emitted from deterrent compartment 214, focused beams of light 203 are emitted from the plurality of light sources 205, and a strobe light is emitted from aperture 221. In other embodiments, the image distortion apparatus 200 is configured such that the deterrents 201, 203, and 207 are emitted from different emission channels than those previously described. For example, in an alternative embodiment, a strobe light is emitted from deterrent compartment 214 and a photographic flash is emitted from the aperture 221.

In addition, the focused beam of light may be a visible light whereas the strobe light has a frequency and intensity similar to that of strobe lights in a disco hall to produce successive pulses of light. Additionally, the photographic flash provides an effect similar to that of a photographic camera. In an embodiment, the strobe light includes pulses of light with a pulse frequency of two pulses per second.

In other embodiments, the multiple deterrents 201, 203, and 207 are engaged simultaneously to provide a burst of light that inhibits an identifiable image of an entity from being captured by filming equipment such as a photographic camera. In another embodiment, the deterrents 201, 203, and 207 are engaged in sequence such that many bursts of light are created in sequence to inhibit an identifiable image of an entity form being captured. For example, the trigger component 208 can first engage the focused beam of light deterrent, followed by the strobe light, and further by the photographic flash.

Additionally, a reflective material 211 is disposed on the housing component 204, a portion of the shaft component 202, and the hanging mechanism 213. In particular, the reflective material 211 is disposed on the shaft component 202 in areas not covered by the finger wedge 206. However, in other embodiments, the reflective material 211 may be interspersed between each finger wedge 206 such that the reflective material 211 is maximized over the area of the image distortion apparatus 200. In an embodiment, the reflective material 211 is only disposed upon the housing component 204 and hanging mechanism 213. Because the reflective material 211 includes a reflective property, it is not visibly shown on the image distortion apparatus 200 within FIG. 2 (and other figures below which include a reflective material disposed upon an apparatus in accordance with the present invention).

The reflective material 211 may include any or a combination of mirrors and kaleidoscope type materials. The reflective material 211 may also include commercial reflective materials such as 3M's Scotchlite reflective material. Further, the reflective material 211 may include any or a combination of reflective films such as a polyethylene film, an aluminum vapor coated film, an acrylic mirror, a mylar film, plexiglass, and a silver-coated film. Furthermore, the reflective material 211 may include meta-materials. In addition, reflective material 211 may include any other material which has a reflectance of greater than 80%.

Further, the reflective materials 211 can harness a light source emitted from filming equipment, such as a photographic flash. Specifically, the reflective material 211 may cause the emitted light to refract there from in the direction from whence the light source was emitted.

FIG. 2B is a perspective back view of an image distortion apparatus 200 in accordance with the present invention. As shown, the back side of the image distortion apparatus 200 includes a plurality of buttons 212 proximate to the trigger component 208. The plurality of buttons 212 may be programmable for various functions, including but not limited to, setting the image distortion apparatus 200 in a manual or automatic mode, designating which deterrents 201, 203, and 207 to engage, setting the deterrents 201, 203, and 207 to engage according to a preset schedule, setting the sequence of the deterrents 201, 203, and 207 to engage, designating the compartment from which the deterrents 201, 203, and 207 will emit, setting the oscillation function's angular distance and speed and setting the rotation direction and speed. In addition, the plurality of buttons 212 may include an OFF/ON switch for the image distortion apparatus 200.

Furthermore, a display 235 is disposed upon the housing component 204. In an embodiment, the display 235 is proximate to the plurality of buttons 212, as shown in FIG. 2B. The housing component 204 includes components (not shown) and circuitry (not shown) for operating the display 235. In an embodiment, the display 235 exhibits a feedback of the functions activated by an entity of the apparatus 200 via the plurality of buttons 212. One having ordinary skill in the art is well aware of displays and monitors and conventional components and circuitry of displays and monitors are within the spirit and scope of the present invention.

Furthermore, FIG. 2B illustrates the hanging mechanism 213 in a second position. In an embodiment when the hanging mechanism 213 is in the second position, the bottom section 216 of the mechanism is rotated downwards such that the top section 215 and the bottom section 216 extend in the same direction as the shaft component 202. Specifically, the second position of the hanging mechanism 213 may be characterized such that the angular distance from the top section 215 to the bottom section 216 of the mechanism 213 is approximately 180°.

FIG. 2B further illustrates a cradle 223, which may be used to seat the image distortion apparatus 200. When the hanging mechanism 213 is in the second position, the image distortion apparatus 200 can be seated within the cradle 223 and while seated within the cradle 223, the image distortion apparatus 200 may be readily available for an entity. In addition, the cradle 223 may contain power circuitry and components such that the image distortion apparatus 200 can charge when the apparatus circuitry 224 is electrically coupled to circuitry within the cradle 223. One having ordinary skill in the art is well aware of circuitry and components used to power devices seated within a cradle, holster, or other mechanism used to power devices, such as but not limited to, personal digital assistant cradles, cellular phone cradles, power tool cradles, and the like. The technology used within a cradle to power a personal digital assistant device may be used within embodiments of the present invention and this would be in the spirit and scope of the present invention.

Additionally, a system and method in accordance with the present invention may embed components, in whole or in part, from the image distortion apparatus 200 into an article of clothing, head covering, jewelry, a pair of glasses, a cellular phone, a personal digital assistant, a purse, and a personal bag. Accordingly, the components, in whole or in part, are embedded in the aforementioned devices to discourage unwanted video recording and photographs, preempt unwanted video recording and photographs, maintain an individual's privacy, and to protect an individual's identity.

Figure 3A:
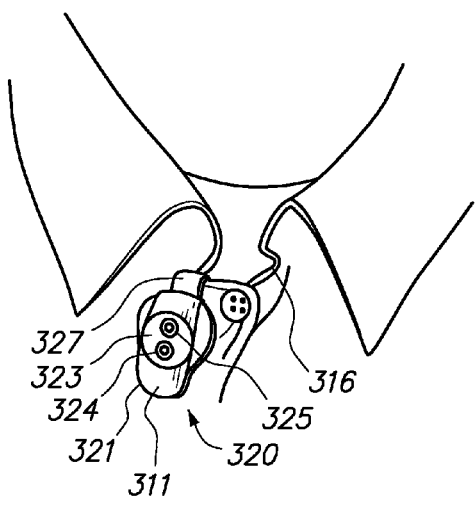
FIG. 3A is an illustration of an apparatus in accordance with the present invention attached to an article of clothing.

For example, FIG. 3A is an illustration of a miniature image distortion apparatus 320 in accordance with the present invention that is adorned on a shirt 316. As shown, the apparatus 320 includes a clip 327 attached to a base portion 321, deterrent compartments 323, and deterrent channels 324, 325 near the center of the base portion 321. FIG. 3A also shows that the apparatus 320 is in a position close to an individual's face such that the apparatus 320 is operable to distort an image taken by photographic and video recording equipment. Furthermore, in an embodiment, a reflective material 311 may be disposed upon the base portion 321 and clip 327 of the apparatus 320. Accordingly, the image distortion apparatus 320 may function and operate similarly to, but not necessarily the same as, the image distortion apparatus 200.

Figure 3B:
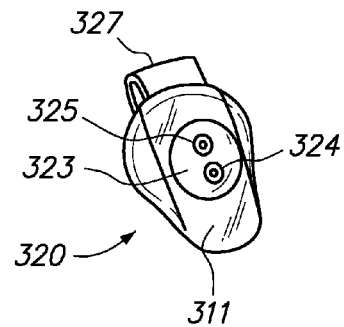
FIGS. 3B-3C are perspective front and side views, respectively, of an apparatus in accordance with the present invention.
Figure 3C:
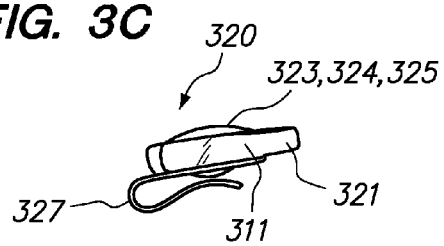

Further, FIGS. 3B-3C are perspective front and side views, respectively of the apparatus 320. As shown by the configuration of clip 327, the apparatus 320 may be coupled to any item of clothing, personal effects, and/or baggage of an entity, and this would be in the spirit and scope of the present invention.

A system and method in accordance with the present invention may utilize, embed, and/or incorporate image distortion techniques and components, in accordance with the present invention, within personal handheld devices such as a cellular phone, personal digital assistant, pager, or the like, and this would also be in the spirit and scope of the present invention. Accordingly, a system and method in accordance with the present invention may incorporate image distortion techniques and components consistent with embodiments of the present invention within a personal handheld device to deter, discourage, and inhibit unwanted video recording and photographs from being taken.

Figure 4:
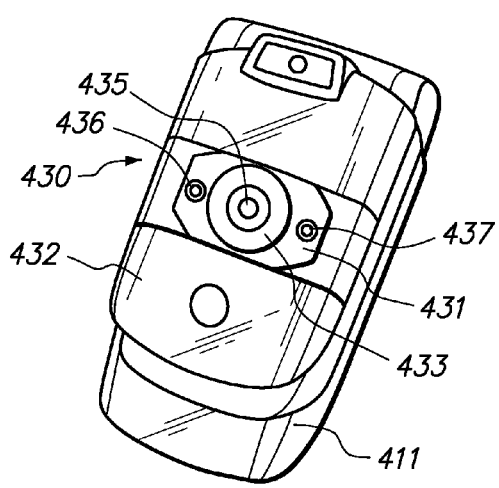
FIG. 4 is an illustration of a cellular phone having image distortion components in accordance with the present invention.

For example, FIG. 4 is an illustration of a cellular phone 430 embedded with image distortion components in accordance with the present invention. As shown, cellular phone 430 includes a face component 432 and a deterrent compartment 431 disposed on the top side 433 of the face component 432. Further, the cellular phone 430 includes deterrent channels 435, 436, 437 within the deterrent compartment 431, from which deterrents are emitted there from. In addition, a reflective material 411 is disposed on the face component 432 of the cellular phone 430. Accordingly, cellular phone 430 may operate or function similarly to, but not necessarily the same as, image distortion apparatus 200.

Figure 5:
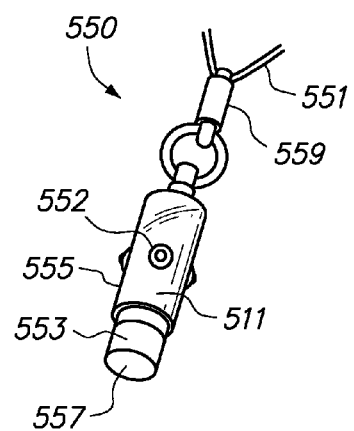
FIG. 5 is an illustration of an ornamental image distortion apparatus in accordance with the present invention suspended from a lanyard.

FIG. 5 is another illustration of an apparatus in accordance with a system and method of the present invention. In particular, FIG. 5 is an illustration of an ornamental image distortion apparatus 550. As shown, the ornamental image distortion apparatus 550 includes a lanyard 551, a coupling component 559 attached thereto, and a shaft compartment 555 attached to the coupling component 559. Additionally, the ornamental image distortion apparatus 550 includes a plurality of deterrent compartments 552, from whence deterrents are emitted there from. Furthermore, a reflective material 511 is disposed on the shaft compartment 555 of the ornamental image distortion apparatus 550. The apparatus 550 further includes a trigger component 553 which is operable to activate the ornamental image distortion apparatus 550 to emit the deterrents there from. In an embodiment, an entity may activate the ornamental image distortion apparatus 550 by pressing a bottom surface 557 of the trigger component 553.

Although a lanyard 551 is shown in FIG. 5, any cord, rope, or jewelry (such as a necklace) that is operable to allow the ornamental image distortion apparatus 550 to suspend from an individual's neck may also be used and this would be in the spirit and scope of the present invention. The lanyard 551 may be utilized to suspend the ornamental image distortion apparatus 550 from any item or structure from where it is not desired that a picture be taken or video be recorded. Accordingly, the ornamental image distortion apparatus 550 may function similarly to, but not necessarily the same as, image distortion apparatus 200.

In operation, an entity may activate the ornamental image distortion apparatus 550 once a person with access to filming equipment (such as a camera) is detected. In an embodiment, the ornamental image distortion apparatus 550 is worn around an entity's neck and when the entity detects a person attempting to take a picture, the entity activates the ornamental image distortion apparatus 550 by pressing the trigger component 553. Subsequently, deterrents emit from the apparatus 550, which obscure an image captured by the filming equipment.

Figure 6:
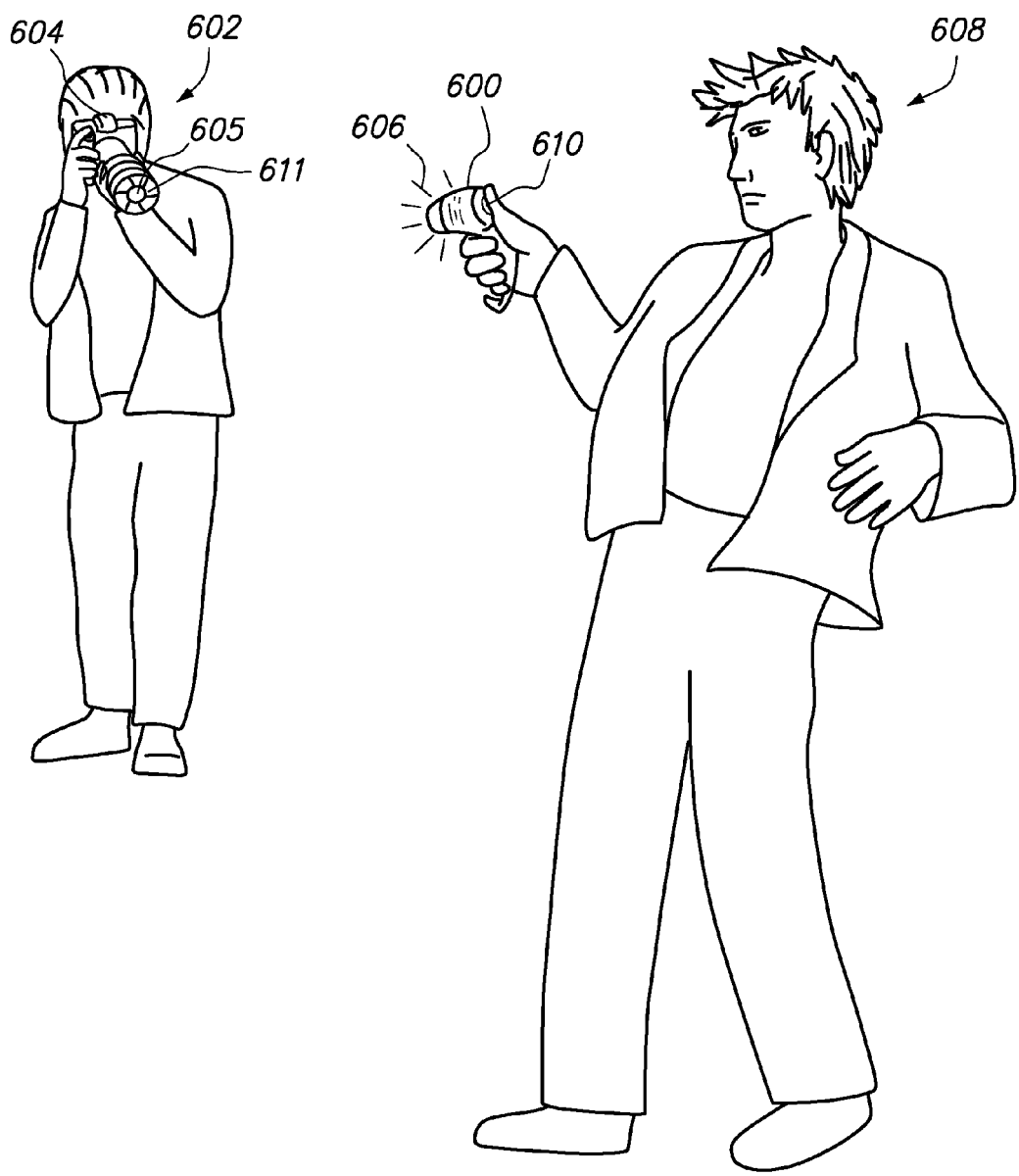
FIG. 6 is an illustration of a celebrity activating an image distortion apparatus in accordance with the present invention while being photographed by a paparazzo.

Now referring to FIG. 6, a method is disclosed for utilizing an apparatus in accordance with the present invention. First, an entity detects an individual with access to filming equipment. Next, the entity directs the apparatus in the direction of the filming equipment and engages the trigger component to activate the apparatus such that a plurality of deterrents emit from the apparatus. Upon emission of the deterrent, an image taken by the individual is obscured. For example, as shown in FIG. 6, a celebrity 608 detects by visual observation that a picture is being taken by a paparazzo 602 having access to a camera 604.

The camera 604 includes a lens 605, which serves as a medium from which light is received and channels the received light to predetermined areas within the camera 604. The camera 604 includes a metering system (not shown), which measures an amount of light in the area of the celebrity 608 and calculates a best-fit exposure value based on a metering mode. One having ordinary skill in the art of photographic cameras is well aware of the functionality of metering systems and incorporating technology thereof within the camera 604 is within the spirit and scope of the present invention.

In the embodiment shown in FIG. 6, the paparazzo 602 having access to the camera 604 is approximately 20 feet from the celebrity 608. Upon detecting the paparazzo 602, the celebrity 608 directs the image distortion apparatus 600 in the direction of the camera 604 and engages the trigger component 610 to activate the apparatus 600 and bombards an area proximate to the camera 604 with deterrents 606 thereby obscuring an image captured by the camera 604.

Figure 7:
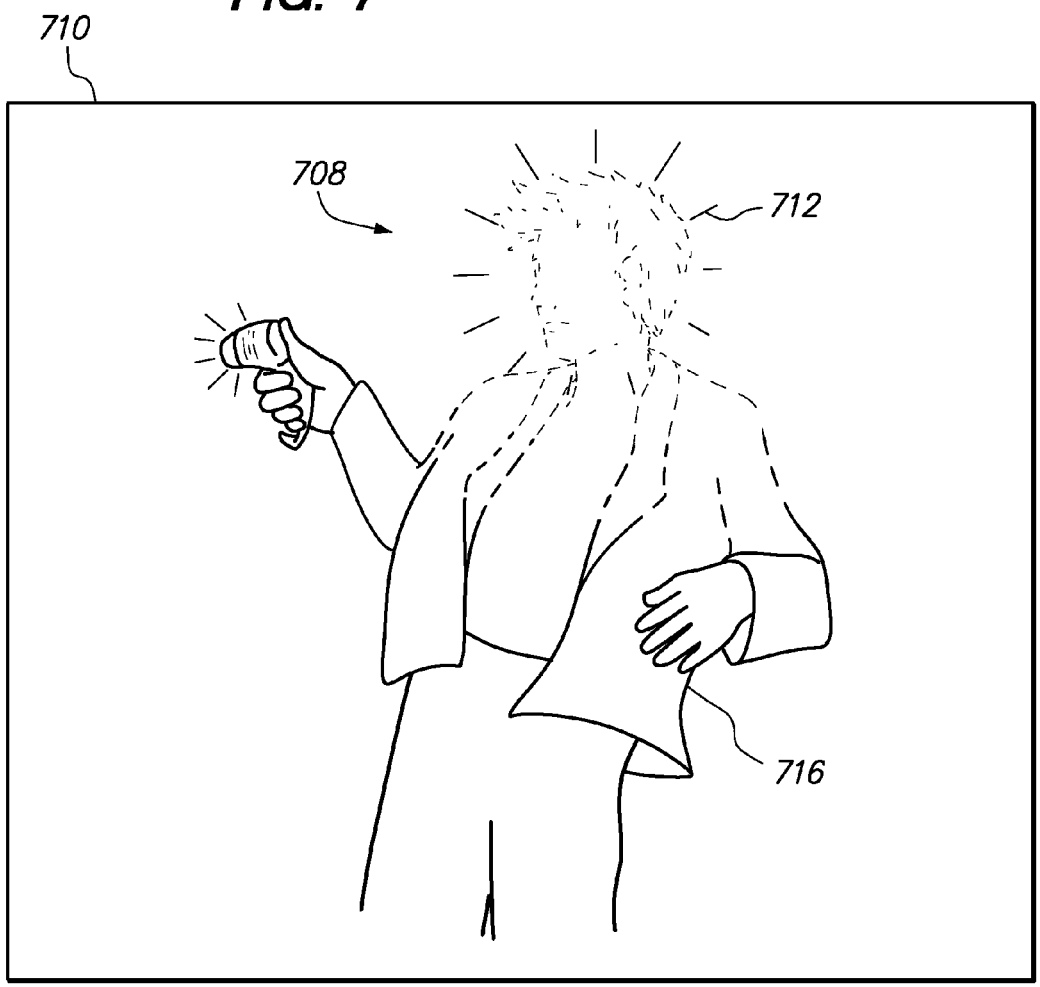
FIG. 7 is an illustration of an overexposed image on a digital card.

Next, referring to FIGS. 6 and 7, an image 708 of the celebrity 608 captured by the camera 604 is shown. As shown, the image 708 is embedded within a digital card 710 and purports to be a representation of a likeness of the celebrity 608. FIG. 7 further shows that the likeness of the celebrity 608 is obscured by the deterrents 606 such that the likeness of the celebrity 608 is practically unrecognizable, particularly to third-party viewers. As shown, the obscured area within the image 708 is a hotspot 712. In an embodiment, the hotspot 712 is created by the deterrents' 606 ability to provide too much light, thereby obscuring the image 708. As shown, the hotspot 712 is characterized as an area within the digital card 710 that is burned out by the deterrents 606, which visibly appears as an area of bright light. Alternatively, away from the hotspot 712, the bright light areas taper off to areas of soft light. In particular, the bright light areas render images practically unrecognizable and the soft light areas allow images within a digital card, film, or magnetic videotape to be recognizable by third-party viewers (such as consumers of celebrity magazines).

Moreover, as shown in FIG. 7, the head of the celebrity 608 within the center of the hotspot 712 is practically unrecognizable. As one looks away from the hotspot 712, the image 708 of the celebrity 608 is increasingly recognizable. For example, the lower region of the jacket 716 is more recognizable than the celebrity's 608 face within the image 708. Accordingly, a system and method in accordance with the present invention may utilize an image distortion device to create a hotspot(s) within a digital card by intentionally overexposing the digital card.

Although the aforementioned embodiment utilizes the apparatus 600 to create a hotspot through overexposure, the apparatus 600 may also be used to create a cold-spot by causing an image to be underexposed in a digital card, film, or video recording medium, or other medium.

For example, when the image distortion apparatus 600 emits the deterrents 606, such as focused beams of light, at the camera 604 the deterrents 606 cause a sudden large amount of light to strike the surface of the lens 605 of the camera 604 of the lens and the camera 604 attempts to adjust to the light by virtue of the camera's 604 metering system (not shown). In an embodiment, the camera 604 attempts to adjust to the focused beam of light by closing the shutters 611 of the camera 604. In other embodiments, the shutters 611 do not close entirely, however, but re-positions such that substantially less light is able to reach the lens 605 of the camera 604. Once the shutters 611 close or re-positions such that substantially less light reaches the lens 605, images taken by the camera 604 will be under-exposed because the camera 604 fails to receive adequate light to expose a film or an image on a digital card.

In yet another embodiment, the deterrents 606 are primarily a strobe light which under-exposes an image captured by the camera 604. As discussed above, the strobe light may include a plurality of high-intensity light pulses. In the embodiment, the image distortion apparatus 600 emits a strobe light that strikes the lens 605 of the camera 604. Once a light pulse from the strobe light strikes the lens 605 of the camera 604, the shutters 611 close or re-positions such that substantially less light reaches the lens. Between light pulses of the strobe light, the shutters 611 re-open or re-positions such that more light can reach the lens 605. However, because the strobe light may include pulses of light with a frequency of two pulses per second, the camera 604 is forced to adjust the shutters 611 rapidly to adjust to the emitted pulses of light. As such, the constant adjustment of the shutters 611 causes a net effect of insufficient light received into the camera 604 thereby under-exposing a film or an image on a digital card or other recording medium.

Figure 8:
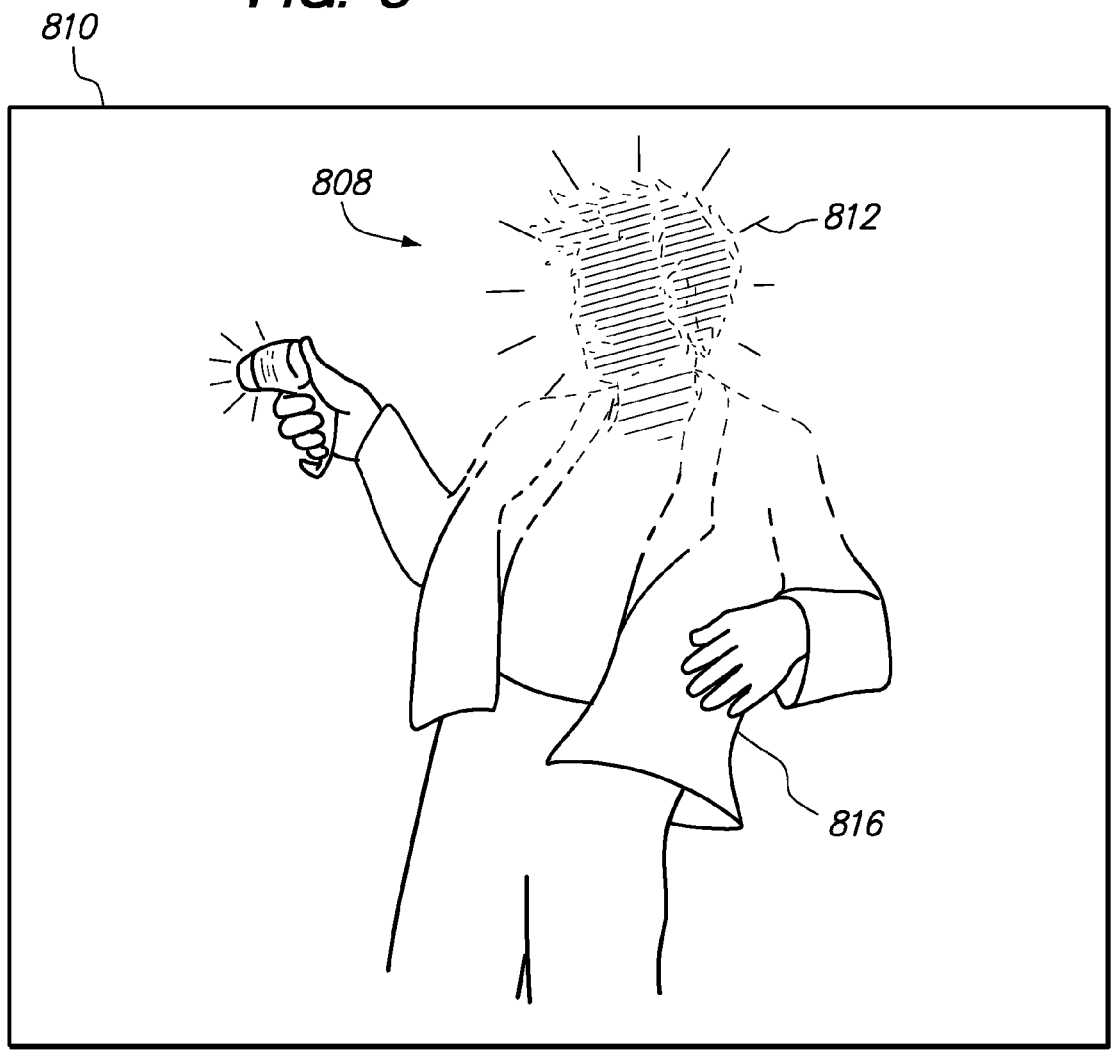
FIG. 8 is an illustration of an under-exposed image on a digital card.

Now referring to FIGS. 6 and 8, an under-exposed image 808 embedded within a digital card 810 is illustrated in FIG. 8. As shown, the under-exposed image 808 purports to be a representation of a likeness of the celebrity 608. Furthermore, FIG. 8 illustrates that the likeness of the celebrity 608 is obscured by the deterrents 606 such that the likeness of the celebrity 608 is practically unrecognizable to third-party viewers. As shown, the obscured area within the under-exposed image 808 is a cold-spot 812, which refers to an area of under-exposure. In an embodiment, the cold-spot 812 is created by the deterrents' 606 ability to provide inadequate light serving to obscure the under-exposed image 808 of the celebrity 608. As shown, the cold-spot 812 is characterized as an area within the digital card 810 that visibly appears as dark, undefined regions. Alternatively, away from the cold-spot are areas of sharp, crisp detail. As one looks away from the cold-spot 812, the under-exposed image 808 of the celebrity 608 is increasingly recognizable. For example, the lower region of the jacket 816 is more recognizable than the celebrity's 608 face within the under-exposed image 808.

In particular, the dark, undefined regions render the likeness of the celebrity 608 practically unrecognizable to third-party viewers and the sharp, crisp detail areas within a digital card, film, or magnetic videotape are visible to third-party viewers.

In addition, a system and method in accordance with the present invention may be utilized to maintain the privacy of the individual. Maintaining the privacy of the individual may include any of discouraging an individual from producing images of the entity, discouraging items within an area from being photographed, discouraging the items within the area from being videotaped, discouraging the entity from being photographed, and discouraging the entity from being videotaped.

Figure 9:
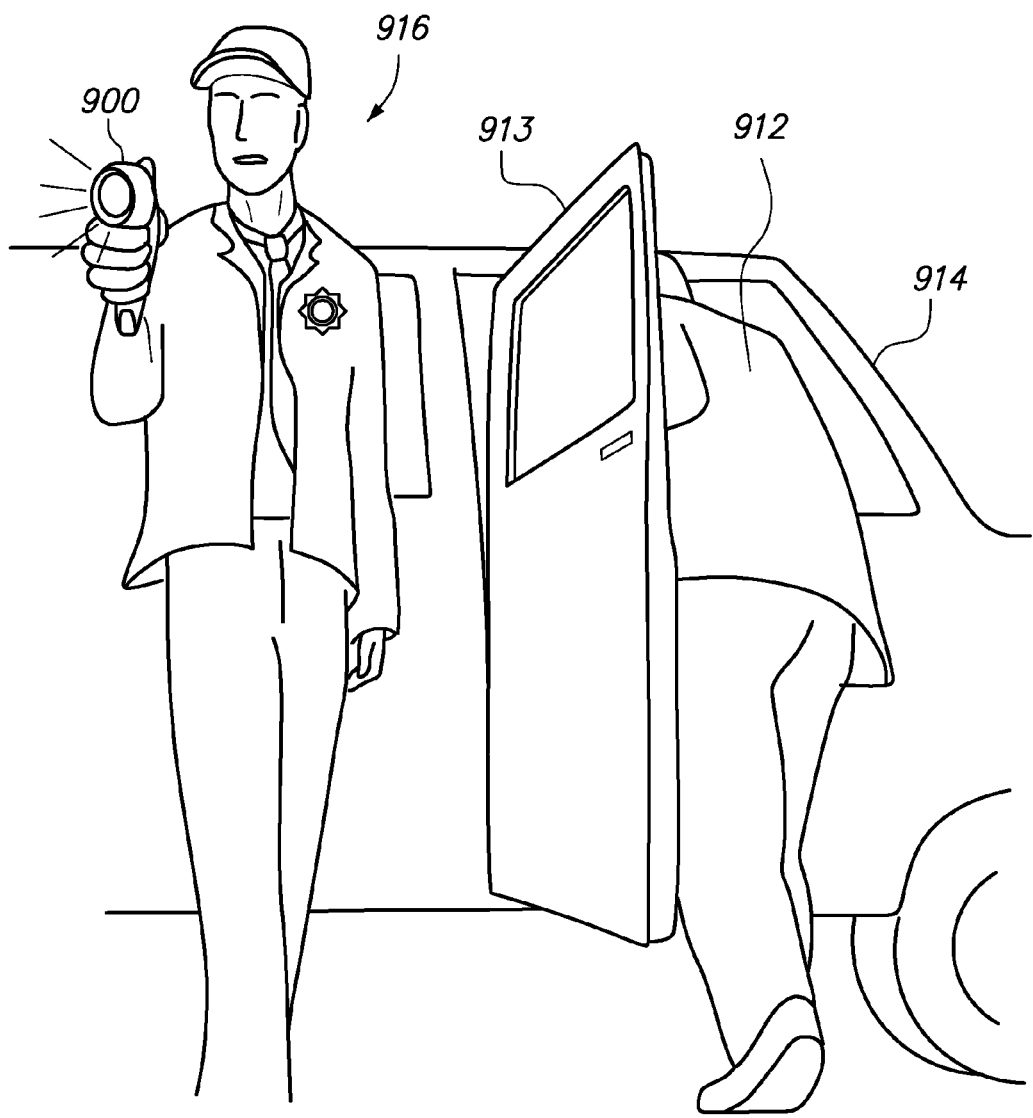
FIG. 9 is an illustration of a manner to which an entity's identify is protected.

For example, FIG. 9 is an illustration of a manner to which an entity's identity is protected. As shown, an entity 912 enters a passenger door 913 of a vehicle 914. As the entity 912 enters the vehicle 914, a law enforcement officer 916 activates an image distortion apparatus 900 to obscure any images created by filming equipment in the general area of the vehicle 914. In an embodiment, the law enforcement officer 916 scans the apparatus 900 in directions which the officer 916 believes filming equipment may be hidden. However, in yet another embodiment, the law enforcement officer 916 scans the image distortion apparatus 900 back in forth a total angular distance of approximately 180° per scan cycle as a protective mechanism to ensure the privacy of the entity 912. Further, entity 912 may don identity protection gear such as a face shield to further maintain the entity's 912 identity.

Furthermore, in the embodiment illustrated in FIG. 9, the entity 912 is a confidential or secret witness whose identity is classified to protect the safety of the entity 912. However, entity 912 may have another title or status which requires that the entity's 912 identity be made confidential. For example, the entity 912 may be a prisoner, defendant, juror, judge, lawyer, court personnel, and/or public official and this would be in the spirit and scope of the present invention.

Furthermore, the entity 912 and law enforcement officer 916 are outside of a government building. However, the apparatus 900 may also be activated within a government building and along a corridor of the government building and this would also be in the spirit and scope of the present invention. As such, the use of the apparatus 900 to inhibit unwanted photography and video recording is not limited to the location of the entity 912.

Figure 10:
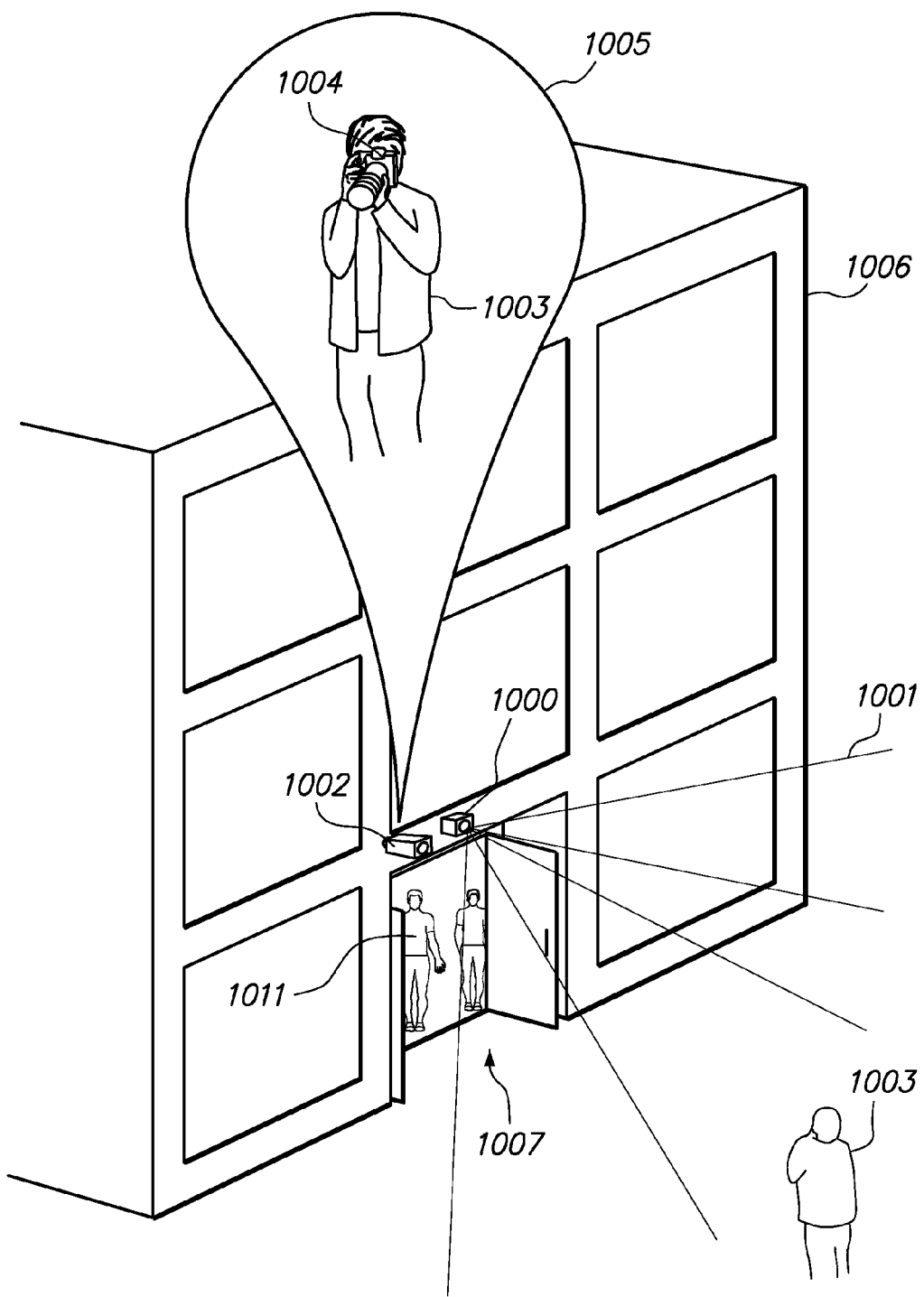
FIG. 10 is an illustration of an image distortion apparatus in accordance with the present invention attached to an external structure of a government building.

Next, a method is described with reference to FIG. 10 for utilizing an image distortion apparatus 1000 in accordance with the present invention to inhibit unwanted photography of and within a government building 1006. As shown, a surveillance camera 1002 detects a covert government operative 1003 with access to photographic equipment 1004 outside of the government building 1006, as illustrated in representation 1005. Once the covert government operative 1003 is detected, the image distortion apparatus 1000 subsequently emits a plurality of deterrents 1001 in the direction of the photographic equipment 1004 to distort images captured therein. In particular, the plurality of deterrents 1001 emitted from the image distortion apparatus 1000 creates a hotspot or a cold-spot on a recording medium stored within the photographic equipment 1004 thereby making an image practically unrecognizable to third-party viewers. Accordingly, the privacy of the government building 1006 is maintained by utilizing the image distortion apparatus 1000 to discourage the operative 1003 from taking unwanted video recording and photographs of the government building 1006 and the individuals 1011 within a corridor 1007 of the government building 1006. In addition, an image distortion apparatus 1000 is attached to each side of the government building 1006.

Furthermore, the image distortion apparatus 1000 may be activated automatically according to a predetermined schedule. For example, the image distortion apparatus 1000 may include wireless circuitry and components and can be controlled automatically via an electronic network (not shown). One having ordinary skill in the art in the art of electronic networks are well aware of the circuitry and components of electronic networks such as receivers, wired and wireless network systems, and the like and such knowledge is within the spirit and scope of the present invention. In an embodiment, the image distortion apparatus 1000 is programmed remotely such that the apparatus 1000 is programmed to activate from 8-9 a.m. and 5-6 p.m., during the period when persons typically arrive and leave the government building 1006. In yet other embodiments, the image distortion apparatus 1000 may be activated remotely once a person with access to filming equipment is detected by the surveillance camera 1002.

In addition, a system and method in accordance with the present invention may be used in additional applications to discourage, deter, or inhibit unwanted photography or video recording on a larger scale than that described in relation to hand-held image distortion devices (supra).

Figure 11:
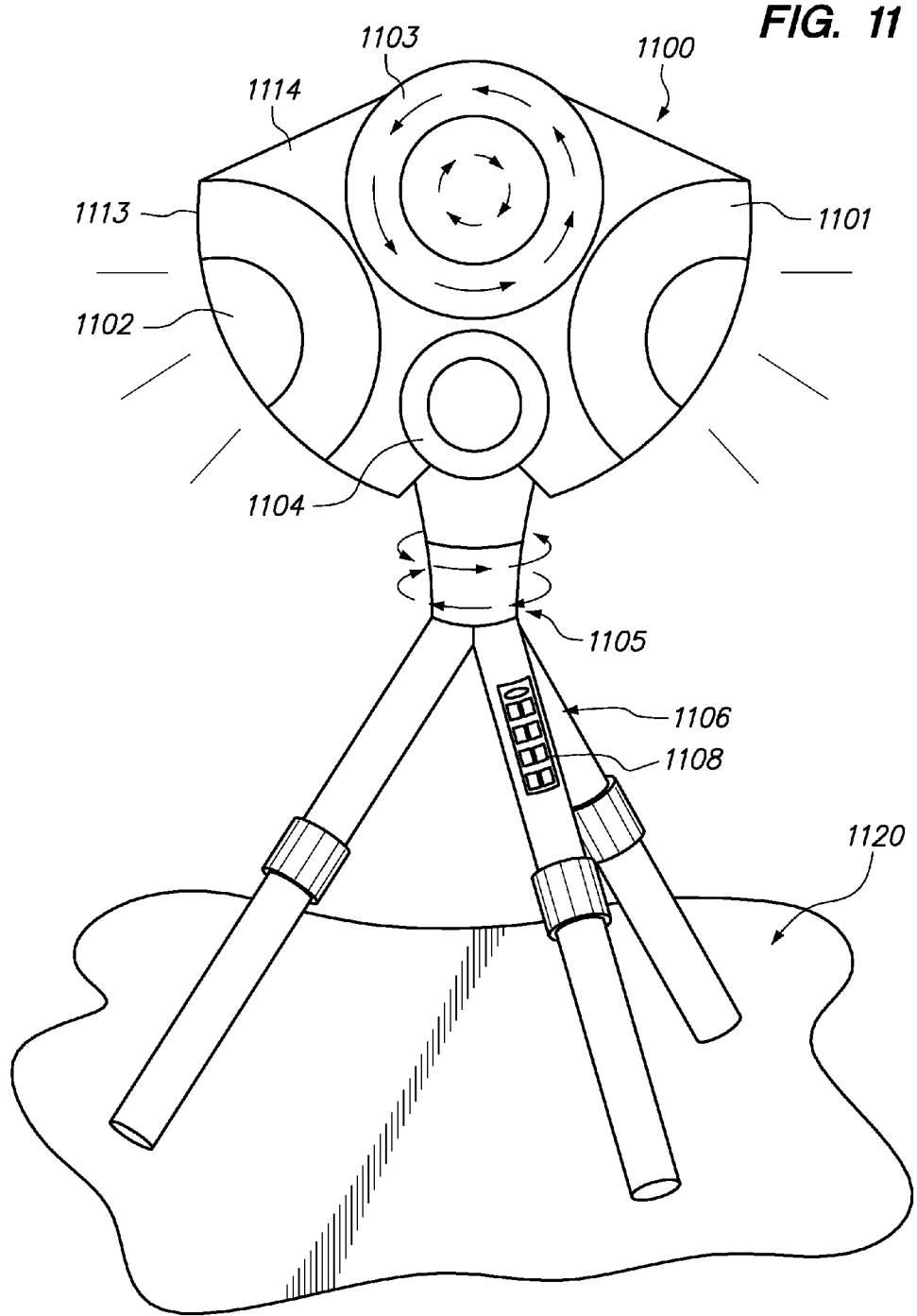
FIG. 11 is an illustration of an image distortion tower in accordance with the present invention.

For example, FIG. 11 is an illustration of an image distortion tower 1100. As shown, the image distortion tower 1100 includes a base 1106 which enables the tower 1100 to stand freely upon a surface 1110. In an embodiment, the base 1106 is a tripod-like structure which may include a plurality of telescoping legs 1111. Upon the base 1106 is an oscillator mechanism 1105 which enables a deterrent emitter station 1113, disposed above the mechanism 1105, to oscillate back and forth. The image distortion tower 1100 further includes a control panel 1108 disposed upon the base 1106. The control panel 1108 may be used to program the image distortion tower 1100 to oscillate a predetermined frequency and angular direction.

For example, the image distortion tower 1100 may oscillate back and forth an angular distance of 180° each oscillation cycle, and in an embodiment, the image distortion tower 1100 oscillates back and forth between −90° and +90° such that the image distortion tower 1100 emits deterrents in a sweeping fashion. Accordingly, the image distortion tower 1100 may emit focused beams of light, strobe lights, and photographic flashes in a sweeping fashion, in a manner programmed by an operator.

Furthermore, the deterrent emitter station 1113 includes a plurality of light sources 1101, 1102, 1103, and 1104, in addition to a reflective material 1114 disposed thereon. The plurality of light sources 1101, 1102, 1103, and 1104 emit deterrents a predetermined distance from the image distortion tower 1100. The deterrents 1110 may be emitted a distance up to 120 feet from the image distortion tower 1100.

Specifically, the various deterrents may be emitted different distances from the image distortion tower 1100 depending upon the type of deterrent emitted. For example, focused beams of light and strobe lights may be emitted further distances from the image distortion tower 1100 than that of emitted photographic flashes.

In an embodiment, each light source 1101, 1102, 1103, and 1104 emits a single deterrent there from. However, the image distortion tower 1100 may be constructed such that light sources 1101 and 1102 emit strobe lights and light sources 1103 and 1104 emit focused beams of light, respectively.

As stated, light sources 1101 and 1102 emit strobe lights out from the deterrent emitter station 1113. In an embodiment, the strobe lights emitted from light sources 1101 and 1102 pulse at an alternating frequency. As such, the strobe lights emitted from light sources 1101 and 1102 collectively create alternating pulses of strobe lights.

In addition, light sources 1101, 1102, 1103, and 1104 may emit a focused beam of light that rotates in a counter-clockwise direction. For example, light source 1103 may rotate about the deterrent emitter station 1113 in a counter-clockwise or clockwise direction (such as light source 1103 shown in FIG. 11). One having ordinary skill in the art is well aware of the functionality of rotating devices and therefore incorporating conventional circuitry and components of rotating devices is within the spirit and scope of the present invention.

Accordingly, the deterrents emitted by the plurality of light sources 1101, 1102, 1103, and 1104 collectively create sufficient chaos and disruption to effectively deter, discourage, and inhibit persons with access to high speed cameras and video recorders from taking unwanted pictures and capturing video recording.

Figure 12:
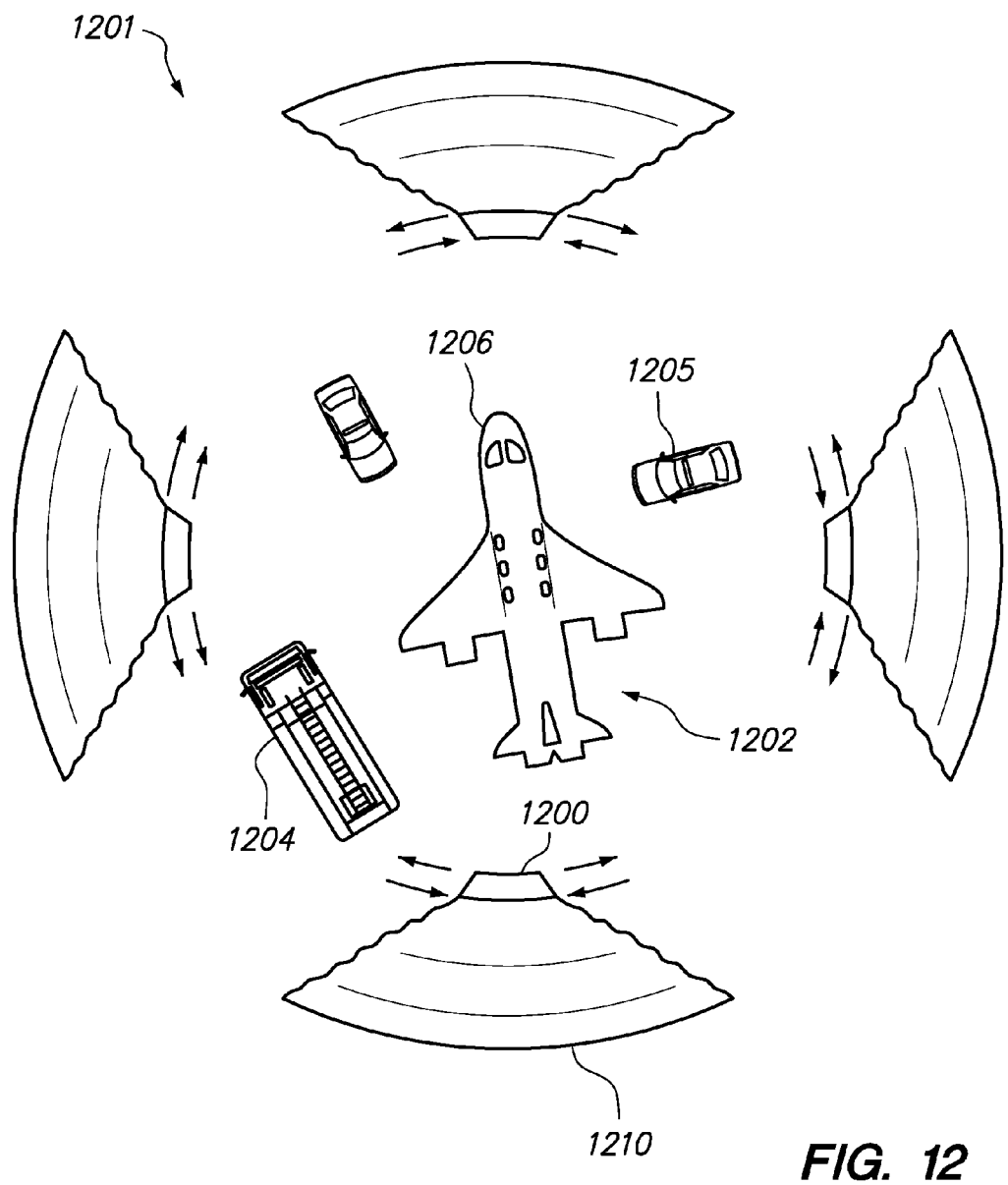
FIG. 12 is an illustration of an image distortion bombardment zone around a crash site.

Now referring to both FIGS. 11 and 12, a system and method in accordance with the present invention may be utilized to create an image distortion bombardment zone around an area of interest such as a classified, confidential, and/or sensitive area or event by use of a plurality of image distortion towers 1200. For example, an area of interest may be an event, a crash site, a crime investigation zone, and a newsworthy scene.

FIG. 12 illustrates an image distortion bombardment zone 1201 erected around a crash site 1202. The bombardment zone 1201 can be erected to deter, discourage, or inhibit individuals from obtaining photographs or video recordings of the crash site 1202. For example, the bombardment zone 1201 may be erected by authorized personnel, such as law enforcement, and activated such that casual observers, the paparazzi, or other third party individuals are inhibited from obtaining clear photographs or video recording of activity within the crash site 1202.

As illustrated in FIG. 12, the crash site 1202 includes a crashed plane 1206 surrounded by emergency vehicles such as an ambulance 1204 and law enforcement vehicles 1205. Surrounding the crash site 1202 is a plurality of image distortion towers 1200, as further illustrated. Furthermore, the plurality of image distortion towers 1200 emit deterrents 1210 such as focused beams of light, strobe lights, and photographic flashes such that individuals with filming equipment are inhibited from capturing identifiable images of the crash site 1202. In addition, the image distortion towers 1200 utilize a reflective material disposed thereon to reflect back light emitted from filming equipment. In yet another embodiment, each image distortion tower 1200 oscillates back and forth an angular distance of greater than 180° such that the deterrents emitted from each adjacent tower 1200 intersect.

Although FIG. 12 illustrates that the bombardment zone 1201 is erected by use of four image distortion towers 1200, a bombardment zone may be erected by using less than four image distortion towers. For example, a bombardment zone may be erected using two image distortion towers. In the embodiment, both image distortion towers oscillate a total angular distance of 180°, thereby ensuring that deterrents are emitted in every angular direction around the bombardment zone.

Further, a bombardment zone may be erected using a single image distortion tower in addition to using natural landmarks such as buildings, parked cars, trees, bodies of water, hills, and the like. For example, in a commercial area where a group of buildings form a semi-circle, a single image distortion tower may be used to erect a bombardment zone such that the buildings and single image distortion tower provides ample obstruction to prevent a clear camera shot or video recording within the bombardment zone.

In other embodiments, a system and method of the present invention may be used to protect the privacy of an entity while the entity is in the privacy of their residence. For example, an entity may regularly sun bathe in the entity's backyard and may desire that neighbors lack the capacity to obtain publicly embarrassing images of the entity. As such, an image distortion apparatus in accordance with the present invention may be suspended to the entity's residence in an area near the entity's sunbathing location. For example, an image distortion apparatus is attached to the residence via the apparatus' hanging mechanism. Further, the image distortion apparatus may also be utilized while the entity is in a private room, swimming pool, sauna, porch, and loft and this would also be in the spirit and scope of the present invention.

In addition, an image distortion apparatus in accordance with the present invention may be utilized within a vehicle to obscure photographic images and video recording of an entity within or near the entity's vehicle.

Figure 13:
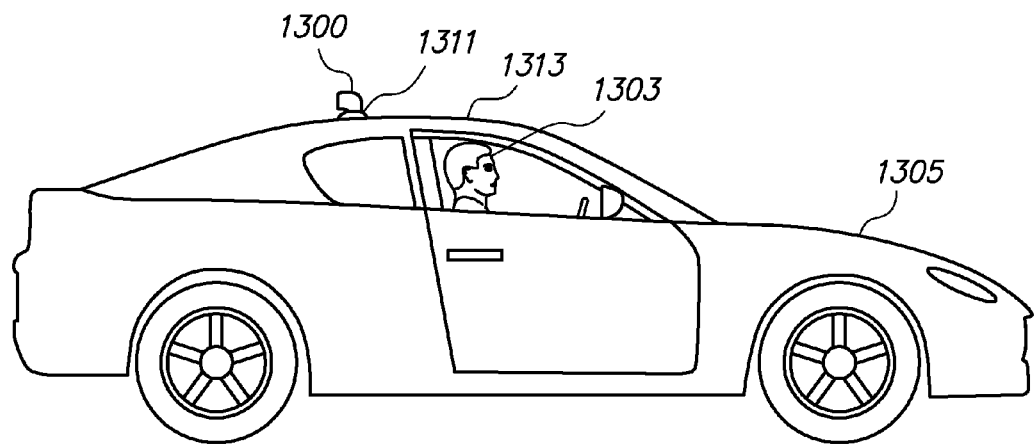
FIG. 13 is an illustration of an image distortion apparatus attached to an external portion of a vehicle.

For example, FIG. 13 illustrates a vehicle 1305 equipped with a compartment 1311 on the roof 1313 of the vehicle 1305 for seating the image distortion apparatus 1300 within the compartment 1311. Within the vehicle 1305, the entity 1303 can activate the image distortion apparatus 1300 remotely to deter, discourage, and inhibit unwanted photography and video recording. Accordingly, an image distortion apparatus in accordance with the present invention can be coupled to various structures and utilized for many applications.

In addition, the entity 1303 may be a celebrity and upon leaving a public venue, the entity 1303 may activate the image distortion apparatus 1300 to inhibit unwanted photography or video recordings.

Figure 14:
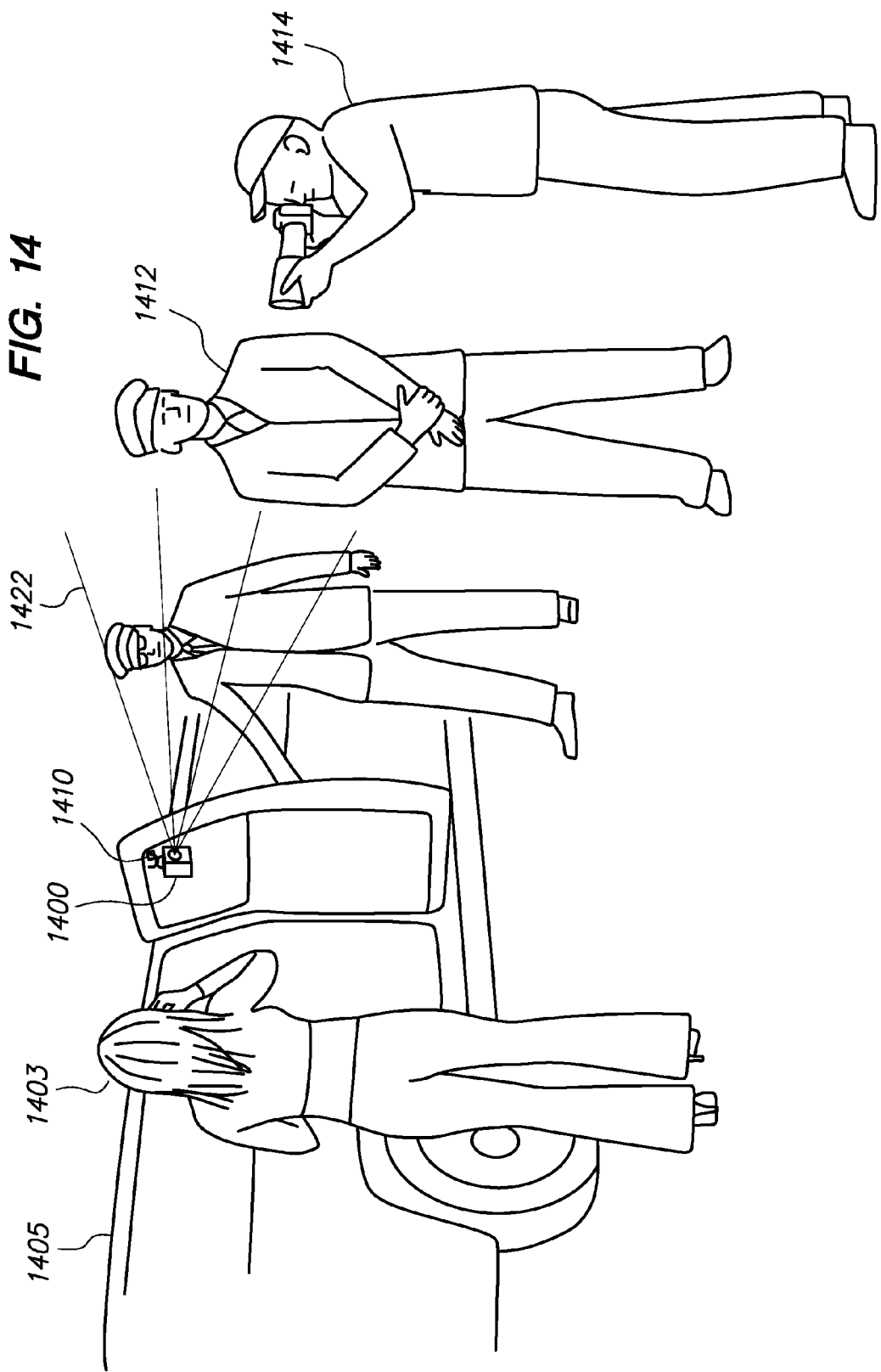
FIG. 14 is an illustration of an image distortion apparatus attached to a roof of a vehicle.

For example, FIG. 14 shows the entity 1403 walking to her vehicle 1405, accompanied by bodyguards 1412. In the embodiment, the entity 1403 activates the apparatus 1400, attached to a hook 1410, remotely to emit deterrents 1422 in the direction of a member of the paparazzi 1414. However, the entity 1403 may also activate the image distortion apparatus 1400 manually or via a wireless network accessible by a cellular phone, personal digital assistant, or any other electronic device. Accordingly, an entity can attribute an image distortion apparatus remotely to distort an image captured by filming equipment.

Figure 15A:
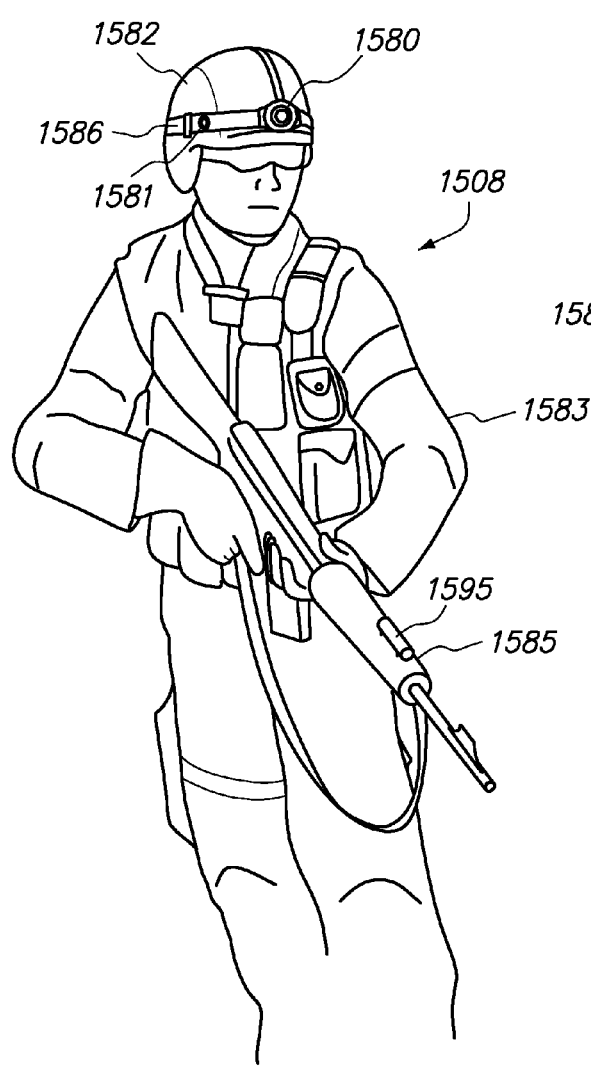
FIGS. 15A and 15B are illustrations of a soldier donning a helmet embedded with an image distortion components in accordance with the present invention and a perspective view of the helmet, respectively.
Figure 15B:
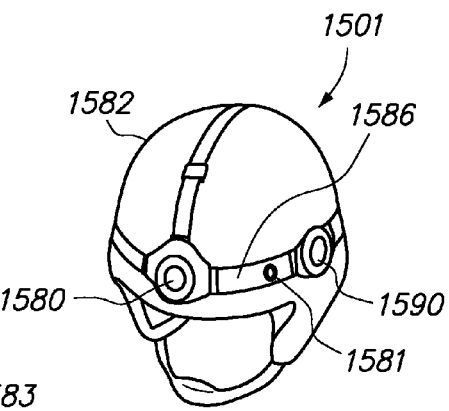

In addition, the system and method is also applicable to military operations. For example, FIG. 15A shows an illustration of a soldier 1508 donning a helmet 1501 which includes an image deterrent compartment 1580 coupled thereto. As shown, the soldier 1508 is in full military uniform 1583 with a rifle 1585 in hand. In an embodiment, the soldier may detect an opposing soldier or one with access to filming equipment and subsequently activates the distortion apparatus in a direction of the filming equipment. In the event that the soldier 1508 detects the opposing soldier or one with access to filming equipment the soldier 1508 may activate the helmet 1501 to emit deterrents in the direction of the filming equipment. In addition, an apparatus distortion device 1595 is coupled to the rifle 1585 and is operable to emit deterrents to distort images captured by filming equipment. FIG. 15B provides a perspective view of the helmet 1501.

As shown in FIG. 15B, the helmet 1501 includes a crown member 1582 operable to be worn by the soldier 1508. In addition, a plurality of deterrent compartments 1580, 1590 are coupled to the crown member 1582 via a strap 1586 and are operable to allow deterrents to be emitted there from. For example, deterrent compartment 1580 may emit a focused beam of light whereas deterrent compartment 1590 may emit a photographic flash. The deterrents are emitted from the deterrent compartments 1580 to obscure an image captured by filming equipment.

In addition, the helmet 1501 includes a trigger component 1581 that engages the deterrents for emission in a direction desired by the soldier 1508, which is preferably in the direction of filming equipment. In an embodiment, each deterrent compartment 1580, 1590 emits a unique deterrent relative to the other deterrent compartments 1580, 1590. The deterrents may be engaged selectively, simultaneously, in sequence, and/or in combination with other deterrents and this would be in the scope and spirit of the present invention.

Accordingly, a system and method in accordance with the present invention may be utilized to counter terrorism. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into cyber-frameworks of the foregoing potential targets, terrorism may be countered by preventing the infection thereof with malware, which has the potential to cause extreme financial harm.

Although the present embodiment has been described in accordance with the embodiments shown, one having ordinary skill in the art will readily recognize that there could be variations to the embodiments and those variations would be within the spirit and scope of the present embodiment. As such, although some of the embodiments have been described in reference to a photographic camera, however, the present invention may also be utilized in an environment that includes video recorders. For example, a system and method in accordance with the present invention may be utilized to deter, discourage, or inhibit one from video recording a secure entry or exit; activity around large scale test sites; and during decoy operations (such as transporting government leaders).

What is claimed is:

1. A method, comprising:
bombarding an area with at least two distinguishable deterrents to obscure an image of an entity captured by filming equipment.

2. The method of claim 1 further comprising detecting an individual with access to the filming equipment within the area prior to bombarding the area with deterrents.

3. The method of claim 2, wherein detecting the individual is any of a group comprising visually observing the individual, utilizing a viewfinder, utilizing a motion detector, utilizing night vision, utilizing a heat sensor, and utilizing a surveillance camera.

4. The method of claim 2, wherein the individual is any of a group comprising a non-famous person, a paparazzo, the paparazzi, and a covert government operative.

5. The method of claim 2 further comprising engaging a trigger component to bombard the area with the deterrents after the individual is detected within the area.

6. The method of claim 2 further comprising maintaining privacy of the entity by discouraging the individual from producing additional images of the entity.

7. The method of claim 6, wherein maintaining privacy is any of a group comprising discouraging items within the area from being photographed, discouraging the items within the area from being videotaped, discouraging the entity from being photographed, and discouraging the entity from being videotaped.

8. The method of claim 1 further comprising burning an imprint on a digital card stored within the filming equipment by bombarding the filming equipment with the deterrents.

9. The method of claim 1, wherein bombarding the area with deterrents is any from a group comprising focusing a beam of light in a direction of the filming equipment, focusing a strobe light in the direction of the filming equipment, triggering a photographic flash proximate to the filming equipment, and utilizing reflective materials to harness a light emitted by the filming equipment by causing the light to refract from the reflective material in a direction from whence the light was emitted.

10. The method of claim 1, wherein the area is any of a group comprising a restaurant, a nightclub, a parking lot, along a sidewalk, a corridor of a government building, and a battle zone.

11. The method of claim 1, wherein the deterrents consist of a focused beam of light, a strobe light, and a photographic flash.

12. The method of claim 1, wherein the image purports to be a representation of a likeness of the entity.

13. The method of claim 1, wherein the entity is any of a group comprising a non-famous person, a celebrity, a public official, a prisoner, a patron, and a classified operative under control of a government authority.

14. The method of claim 1, wherein the image is captured within any of a group selected from a film within a film camera, a digital card within a digital camera, and a magnetic recording medium within a video recorder.

15. The method of claim 1, wherein the filming equipment is any of a group comprising photographic equipment and video equipment.

16. The method of claim 1, wherein the deterrents obscure a likeness of the entity within the image.

17. The method of claim 1, wherein the deterrents obscure the image of the entity by overexposing a digital card.

18. The method of claim 1, wherein the deterrents obscure the image of the entity by under-exposing a digital card.

19. The method of claim 1, wherein the deterrents obscure the image of the entity by creating a hotspot on a digital card.

20. The method of claim 1, wherein the deterrents obscure the image of the entity by creating a cold-spot on a digital card.

21. A method for inhibiting unwanted photography of a celebrity, comprising:
    detecting a paparazzo having access to photographic equipment within a public area by visual observation;
    triggering an apparatus to engage a plurality of deterrents, wherein the plurality of deterrents include a focused beam of light, a strobe light, and a photographic flash;
    bombarding a segment of the public area with the plurality of deterrents in a direction of photographic equipment to obscure the image of a celebrity captured by the photographic equipment by focusing the beam of light in a direction of the photographic equipment, focusing the strobe light in the direction of the photographic equipment, triggering the photographic flash proximate to the filming equipment, and utilizing reflective materials to harness a light emitted by the filming equipment by causing the light to refract from the reflective material in a direction from whence the light was emitted;
    burning an imprint on a digital card stored within the photographic equipment by bombarding the photographic equipment with the plurality of deterrents; and
    maintaining privacy of a celebrity by discouraging the paparazzo from photographing the celebrity to produce additional images of the celebrity.

22. A method for inhibiting unwanted photography of a government building, comprising:
    detecting a covert government operative having access to photographic equipment outside of a government building by utilizing a surveillance camera;
    triggering an apparatus to engage a plurality of deterrents, wherein the plurality of deterrents include a focused beam of light, a strobe light, and a photograph flash;
    bombarding an area proximate to the photographic equipment with the plurality of deterrents to obscure an image of the government building captured by photographic equipment by focusing the beam of light in a direction of the photographic equipment, focusing the strobe light in the direction of the photographic equipment, triggering the photographic flash proximate to the photographic equipment, and utilizing reflective materials to harness a light emitted by the filming equipment by causing the light to refract from the reflective materials in a direction from whence the light was emitted;
    burning an imprint on a digital card stored within the photographic equipment by bombarding the photographic equipment with the plurality of deterrents; and
    maintaining privacy within the government building by discouraging the government operative from photographing inside of the government building to produce images of individuals with the government building.

23. A method, comprising:
    protecting an identity of an individual by bombarding an area proximate to the individual with at least two distinguishable deterrents to obscure an image of the individual captured by filming equipment.

24. The method of claim 23, wherein the deterrents are selected from a group comprising a focused beam of light, a strobe light, and a photographic flash.

25. The method of claim 23, wherein the individual is selected from a group comprising a prisoner, a witness, a defendant, a juror, a judge, a lawyer, and court personnel.

26. The method of claim 24, wherein the area is selected from a group comprising inside a government building, a corridor of the government building, and outside of the government building.

27. A system, comprising:
    a means for detecting a paparazzo having access to photographic equipment;
    a means for bombarding the photographic equipment with a plurality of deterrents to obscure an image of an entity on a recording medium within the photographic equipment;
    a means for distorting the image; and
    a means for reflecting a light emitted by the photographic equipment in a direction of the photographic equipment.

28. An apparatus, comprising:
    a shaft component operable to be held by an entity;
    a housing component extending from one end of the shaft component and operable to allow multiple deterrents to be emitted there from, the housing component comprising:
        a rotation member coupled to a rim portion of the housing component and operable to rotate along a track portion within the rim portion;
        a transparent material coupled to the rotation member and operable to allow a deterrent to travel there through;
        a light source coupled to the transparent material and operable to emit a light;
        a swivel component meshed between the shaft component and the housing component and operable to allow the housing component oscillate in an angular direction;
        a deterrent compartment coupled to an external portion of the housing component and operable to allow an additional deterrent to be emitted there from, wherein each deterrent is operable to obscure an image of the entity captured by filming equipment; and
        a trigger component coupled to the housing component and operable to engage each deterrent.

29. The apparatus of claim 28, wherein a second transparent material is coupled to the rotation member and operable to allow a deterrent to travel there through.

30. The apparatus of claim 28, wherein a reflective material is disposed on a portion of the shaft component and a portion of the housing component.

31. The apparatus of claim 30, wherein the reflective material includes a mirror.

32. The apparatus of 28, wherein each deterrent is operable to engage according to a preset schedule.

33. The apparatus of claim 28, wherein all of the deterrent are operable to engage simultaneously.

34. The apparatus of claim 28 further comprising a hanging mechanism coupled from another end of the shaft component.

35. The apparatus of claim 34, wherein the hanging mechanism is attached to an external structure of a government building.

36. The apparatus of claim 34, wherein the hanging mechanism is attached to an external portion of a vehicle.

37. The apparatus of claim 34, wherein the hanging mechanism is attached to an internal portion of a vehicle.

38. The apparatus of claim 34, wherein the hanging mechanism is attached to an external portion of a residence.

39. A helmet, comprising:
a crown member operable to be worn by an entity;
a plurality of deterrent compartments coupled to the crown member and operable to allow multiple deterrents to be emitted there from, the deterrents are operable to obscure an image of an entity captured by filming equipment and the deterrents include a focused beam of light component and a strobe light component; and
a trigger component disposed on the crown member and operable to selectively engage each deterrent;
wherein the trigger component is operable to engage the deterrents according to a preset schedule.

40. The helmet of claim 39, wherein the trigger component is operable to engage one or more of the deterrents simultaneously.

41. The helmet of claim 39, wherein each deterrent compartment is operable to allow multiple deterrents to be emitted there from.

42. The helmet of claim 39, wherein each deterrent compartment is operable to allow a unique deterrent to be emitted there from in relation to other deterrents emitted from the other deterrent compartments coupled to the crown member.

43. An image distortion tower, comprising:
a base;
a deterrent emitter station coupled to the base;
a first light source disposed on the deterrent emitter station, the first light source operable to emit a deterrent from the deterrent emitter station; and
a oscillator mechanism coupled between the base portion and the deterrent emitter station, the oscillator mechanism operable to oscillate the deterrent emitter station.

44. The image distortion tower of claim 43 further comprising a second light source, a third light source, and a fourth light source all disposed upon the deterrent emitter station.

45. The image distortion tower of claim 43, wherein the first light source rotates in a clockwise direction and the third light source rotates in a counter-clockwise direction.

46. A bombardment zone, comprising:
an area of interest, the area on interest having a perimeter;
a first image distortion tower at one side of the perimeter; and
a second image distortion tower at another side of the perimeter and opposing the first image distortion tower;
wherein the first image distortion tower and the second image distortion tower are each operable to emit deterrents, rotate, include deterrent emitter stations operable to oscillate, and include light sources disposed upon the deterrent emitter stations operable to rotate.

47. The bombardment zone of claim 46, wherein the area of interest are any from a group comprising an event, a crash site, a crime investigation zone, and a newsworthy scene.

48. The bombardment zone of claim 46, wherein the deterrent emitter stations of the first image distortion tower and the second image distortion tower oscillate 180°.

49. An ornamental image distortion apparatus, comprising:
a lanyard;
a shaft component coupled to the lanyard via a coupling component;
a plurality of deterrent compartments disposed throughout the shaft component; and
a trigger component on a bottom surface of the shaft component, the trigger component operable to engage deterrents from each deterrent compartment.

50. The ornamental image distortion apparatus of claim 49, wherein the lanyard is suspended from a person's neck.

* * * * *